(12) United States Patent
Lv et al.

(10) Patent No.: US 10,929,987 B2
(45) Date of Patent: Feb. 23, 2021

(54) LEARNING RIGIDITY OF DYNAMIC SCENES FOR THREE-DIMENSIONAL SCENE FLOW ESTIMATION

(71) Applicant: NVIDIA Corporation, Santa Clara, CA (US)

(72) Inventors: Zhaoyang Lv, Smyrna, GA (US); Kihwan Kim, Campbell, CA (US); Deqing Sun, Providence, RI (US); Alejandro Jose Troccoli, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 398 days.

(21) Appl. No.: 16/052,528

(22) Filed: Aug. 1, 2018

(65) Prior Publication Data

US 2019/0057509 A1     Feb. 21, 2019

Related U.S. Application Data

(60) Provisional application No. 62/546,442, filed on Aug. 16, 2017.

(51) Int. Cl.
*G06T 7/254*        (2017.01)
*G06T 7/90*         (2017.01)
(Continued)

(52) U.S. Cl.
CPC ............. *G06T 7/254* (2017.01); *G06N 3/084* (2013.01); *G06N 5/046* (2013.01); *G06T 3/0093* (2013.01);
(Continued)

(58) Field of Classification Search
CPC ....... G06N 3/084; G06N 5/046; G06T 3/0093
See application file for complete search history.

(56) References Cited

U.S. PATENT DOCUMENTS 6,445,815 B1    9/2002   Sato
6,798,897 B1    9/2004   Rosenberg
(Continued)

FOREIGN PATENT DOCUMENTS

CN       107203753 A     9/2017
WO     2017215899 A2    12/2017
WO     2018000038 A1     1/2018

OTHER PUBLICATIONS

Newcombe et al., "DynamicFusion: Reconstruction and Tracking of Non-rigid Scenes in Real-Time," IEEE, 2015, pp. 343-352.
(Continued)

*Primary Examiner* — Edward Park
(74) *Attorney, Agent, or Firm* — Leydig, Voit & Mayer, Ltd.

(57) ABSTRACT

A neural network model receives color data for a sequence of images corresponding to a dynamic scene in three-dimensional (3D) space. Motion of objects in the image sequence results from a combination of a dynamic camera orientation and motion or a change in the shape of an object in the 3D space. The neural network model generates two components that are used to produce a 3D motion field representing the dynamic (non-rigid) part of the scene. The two components are information identifying dynamic and static portions of each image and the camera orientation. The dynamic portions of each image contain motion in the 3D space that is independent of the camera orientation. In other words, the motion in the 3D space (estimated 3D scene flow data) is separated from the motion of the camera.

20 Claims, 13 Drawing Sheets

(51) Int. Cl.
*G06T 7/50* (2017.01)
*G06N 3/08* (2006.01)
*G06T 7/194* (2017.01)
*G06T 3/00* (2006.01)
*G06T 7/70* (2017.01)
*G06T 7/60* (2017.01)
*G06T 7/11* (2017.01)
*G06N 5/04* (2006.01)
*G06T 7/285* (2017.01)
*G06T 7/215* (2017.01)

(52) U.S. Cl.
CPC ............... *G06T 7/11* (2017.01); *G06T 7/194* (2017.01); *G06T 7/215* (2017.01); *G06T 7/285* (2017.01); *G06T 7/50* (2017.01); *G06T 7/60* (2013.01); *G06T 7/70* (2017.01); *G06T 7/90* (2017.01); *G06T 2207/10028* (2013.01); *G06T 2207/20084* (2013.01)

(56) References Cited

U.S. PATENT DOCUMENTS

| | | | |
|---|---|---|---|
| 7,634,130 B2 | 12/2009 | Yoda et al. | |
| 8,614,705 B2 | 12/2013 | Lefevre et al. | |
| 8,989,518 B2 | 3/2015 | Aratani et al. | |
| 9,445,081 B1 | 9/2016 | Kouperman et al. | |
| 9,826,212 B2 | 11/2017 | Newton et al. | |
| 10,366,498 B2* | 7/2019 | Lee ........................ | H04N 7/183 |
| 2011/0110560 A1* | 5/2011 | Adhikari ................ | G06T 7/246 |
| | | | 382/103 |
| 2015/0043807 A1* | 2/2015 | Aliseychik ............. | H04N 19/12 |
| | | | 382/154 |
| 2016/0275695 A1* | 9/2016 | Luczak ................ | G06K 9/4642 |
| 2017/0178362 A1* | 6/2017 | Akenine-Moller ..... | G06T 15/04 |
| 2018/0182071 A1* | 6/2018 | Ayari ........................ | G06N 3/08 |

OTHER PUBLICATIONS

Geiger et al., "Vision meets Robotics: The KITTI Dataset," PAMI, 2013, pp. 1-6.

Herbst et al., "RGB-D Flow: Dense 3-D Motion Estimation Using Color and Depth," IEEE International Conference on Robotics and Automation (ICRA), May 2013, pp. 2276-2282.

Sun et al., "PWC-Net: CNNs for Optical Flow Using Pyramid, Warping, and Cost Volume," arXiv preprint, 2018, 18 pages, retrieved from https://arxiv.org/pdf/1709.02371.pdf.

Taniai et al., "Fast Multi-frame Stereo Scene Flow with Motion Segmentation," Microsoft Research, 2017, 10 pages, retrieved from https://www.microsoft.com/en-us/research/wp-content/uploads/2017/03/cvpr2017-sceneflow-final.pdf.

Wulff et al., "Optical Flow in Mostly Rigid Scenes," preprint, Max Planck Institute for Intelligent Systems, 2017, 15 pages, retrieved from https://arxiv.org/pdf/1705.01352.pdf.

Vogel et al., "Piecewise Rigid 3D Scene Flow," 2014, 2 pages, retrived from http://sunw.csail.mit.edu/2014/papers2/36_Vogel_SUNw.pdf.

Bideau et al., "The Best of Both Worlds: Combining CNNs and Geometric Constraints for Hierarchical Motion Segmentation," 2018, 10 pages, retrieved from http://vis-www.cs.umass.edu/motionSegmentation/website_CVPR18/cvpr18-bideau.pdf.

Jaimez et al., "A Primal-Dual Framework for Real-Time Dense RGB-D Scene Flow," IEEE International Conference on Robotics and Automation (ICRA), 2015, 7 pages.

Sun et al., "Layered RGBD Scene Flow Estimation," CVPR, 2015, pp. 548-556, retrieved from https://www.cv-foundation.org/openaccess/content_cvpr_2015/papers/Sun_Layered_RGBD_Scene_2015_CVPR_paper.pdf.

Hornacek et al., "SphereFlow: 6 DoF Scene Flow from RGB-D Pairs," CVPR, 2014, 8 pages, retrieved from http://openaccess.thecvf.com/content_cvpr_2014/papers/Hornacek_SphereFlow_6_DoF_2014_CVPR_paper.pdf.

Byravan et al., "SE3-Nets: Learning Rigid Body Motion using Deep Neural Networks," preprint, 2017, 8 pages, retrieved from https://arxiv.org/pdf/1606.02378.pdf.

Ummenhofer et al., "DeMoN: Depth and Motion Network for Learning Monocular Stereo," CVPR, 2017, pp. 5038-5047, retrieved from http://openaccess.thecvf.com/content_cvpr_2017/papers/Ummenhofer_DeMoN_Depth_and_CVPR_2017_paper.pdf.

Zhou et al., "Unsupervised Learning of Depth and Ego-Motion from Video," CVPR, 2017, pp. 1851-1860, retrieved from http://openaccess.thecvf.com/content_cvpr_2017/papers/Zhou_Unsupervised_Learning_of_CVPR_2017_paper.pdf.

Ilg et al., "FlowNet 2.0: Evolution of Optical Flow Estimation with Deep Networks," CVPR, 2017, pp. 2462-2470, retrieved from http://openaccess.thecvf.com/content_cvpr_2017/papers/Ilg_FlowNet_2.0_Evolution_CVPR_2017_paper.pdf.

* cited by examiner

LEARNING RIGIDITY OF DYNAMIC SCENES FOR THREE-DIMENSIONAL SCENE FLOW ESTIMATION

CLAIM OF PRIORITY

This application claims the benefit of U.S. Provisional Application No. 62/546,442 titled "Learning-Based 3D Scene Flow Estimation with RGBD Images," filed Aug. 16, 2017, the entire contents of which are incorporated herein by reference.

FIELD OF THE INVENTION

The present invention relates to three-dimensional (3D) flow estimation for images, and more particularly to learning rigidity of dynamic scenes by a neural network.

BACKGROUND

The estimation of 3D motion from images is a fundamental computer vision problem, and key to many applications such as robot manipulation, dynamic scene reconstruction, autonomous driving, action recognition, and video analysis. The task of estimating 3D motion is commonly referred as 3D motion field or scene flow estimation. 3D motion field estimation in a dynamic environment is, however, a challenging and still open problem when the scene is observed from different viewpoints and the number of moving objects (either rigid or non-rigid) or movement of a single object in each image is large. The difficulty is mainly because the disambiguation of camera motion (ego-motion) from object motion requires the correct identification of rigid static structure of a scene. Existing approaches suffer from demanding computational expenses and often fail when a scene includes multiple moving objects in the foreground. There is a need for addressing these issues and/or other issues associated with the prior art.

SUMMARY

A method, computer readable medium, and system are disclosed for learning rigidity of dynamic scenes by a neural network. Color data are received for a sequence of images corresponding to a dynamic scene in three-dimensional (3D) space including a first image and a second image, where the first image is captured from a first viewpoint and the second image is captured from a second viewpoint. The color data are processed by layers of a neural network model to generate segmentation data indicating a portion of the second image where a first object changes position or shape relative the first object in the first image.

DETAILED DESCRIPTION

A neural network model may be trained in a supervised manner to learn rigidity of dynamic scenes from a training dataset including a large collection of dynamic scene data. The neural network model is trained to directly infer a rigidity mask from color and depth data (RGBD) of two sequential images. Camera motion and projected 3D scene flow can be effectively estimated using computed 2D optical flow for the sequential images and the inferred rigidity mask. In one embodiment, the depth and color data are received for each image. The depth data for each image may be acquired via an active sensor and the color data may be captured by a camera. In another embodiment, the depth data is calculated based on the color data or pairs of stereo images.

Figure 1A:
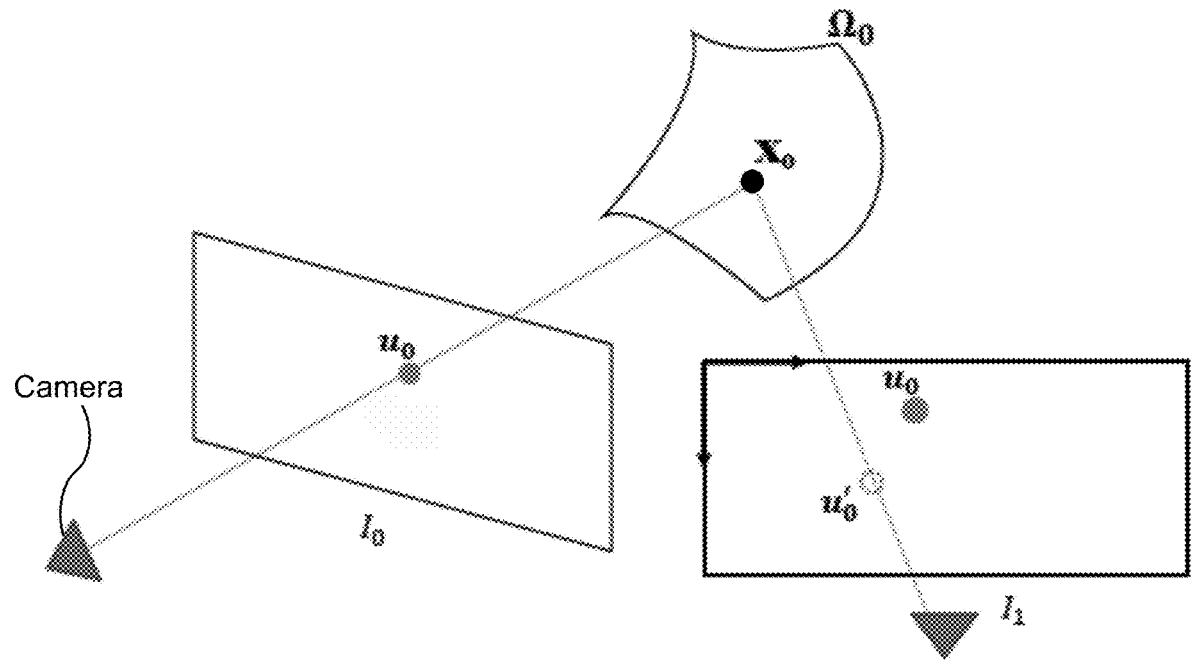
FIG. 1A illustrates 2D motion flow for a static scene resulting from camera motion, in accordance with an embodiment.

FIG. 1A illustrates 2D motion flow for a static scene resulting from camera motion, in accordance with an embodiment. The relationship between 2D image correspondences and scene flow in physical 3D scenes with object motions and camera (viewpoint) motion derived from relative camera poses between two temporal views is defined for the following description. Let $x_t \in \mathbb{R}^3$ be the location of a point x in 3D space on a non-rigid surface $\Omega_t$ of a moving object with respect to a fixed world coordinate system at time t. As shown in FIG. 1A, the point $x_0$ is static and the camera position changes for image $I_0$ compared with image $I_1$. The optical flow in 2D image space due to motion of the camera is a vector from $u_0$ to $u'_0$.

Figure 1B:
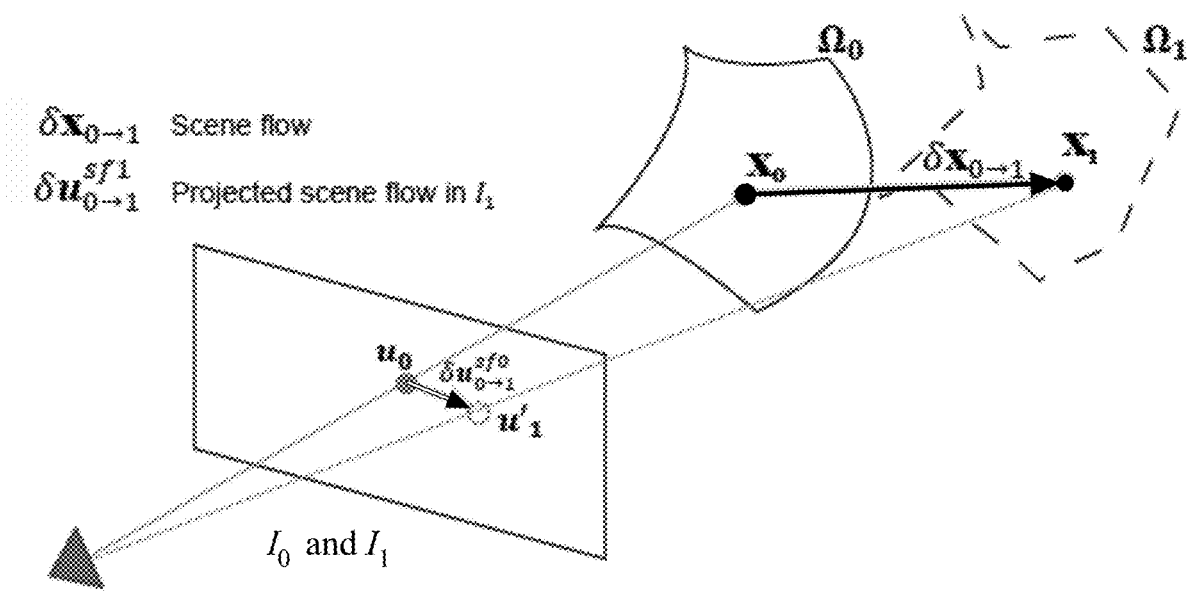
FIG. 1B illustrates 2D motion flow resulting from scene motion for a static camera, in accordance with an embodiment.

FIG. 1B illustrates 2D motion flow resulting from scene motion for a static camera, in accordance with an embodiment. As shown in FIG. 1B, the camera position is static and the point x on the non-rigid surface in the scene changes by $\delta x_{0 \to 1}$ from $x_0$ to $x_1$. The scene motion appears as a projected scene flow $\delta u_{0 \to 1}^{sfl}$ for image $I_0$ compared with image $I_1$. The optical flow due to motion in the scene is a vector from $u_0$ to $u'_1$.

Figure 1C:
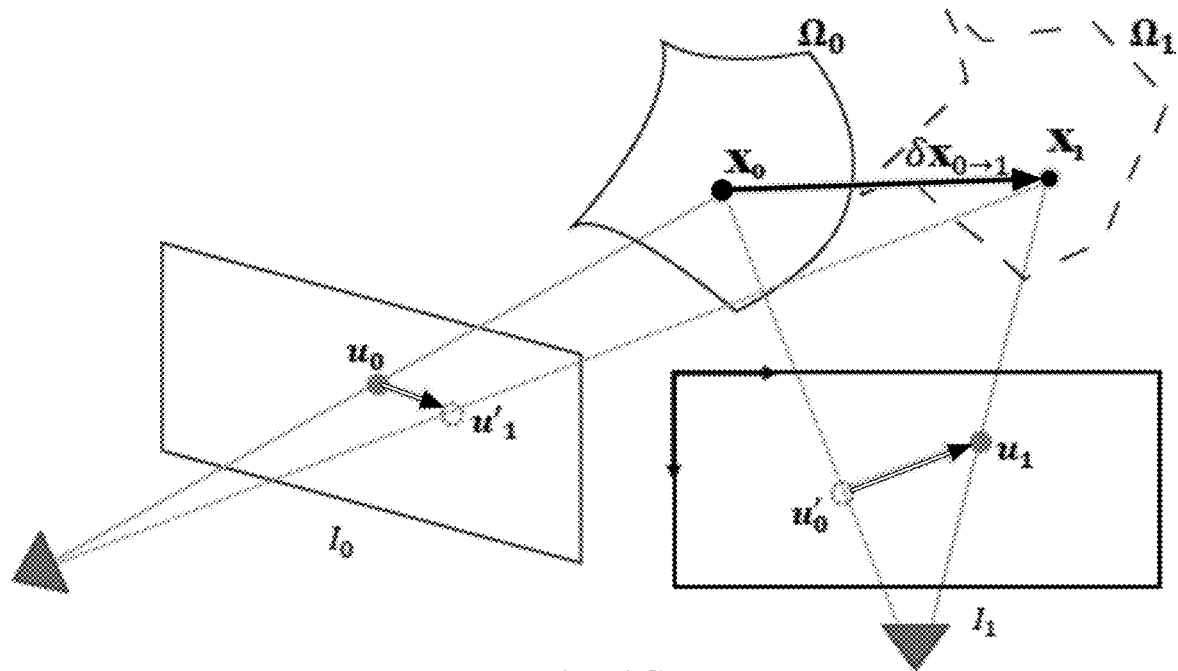
FIGS. 1C and 1D illustrate 2D motion flow resulting from scene motion and camera motion, in accordance with an embodiment.

FIG. 1C illustrates 2D motion flow resulting from scene motion and camera motion, in accordance with an embodiment. The geometry of the scene is changing simultaneously with the camera movement from a first orientation corresponding to image $I_0$ to a second orientation corresponding to image $I_1$. In the dynamic scene, the point $x_0$ moves to $x_1$ and the projections of point x in the two images are shown as $u_0$ and $u_1$, respectively.

Figure 1D:
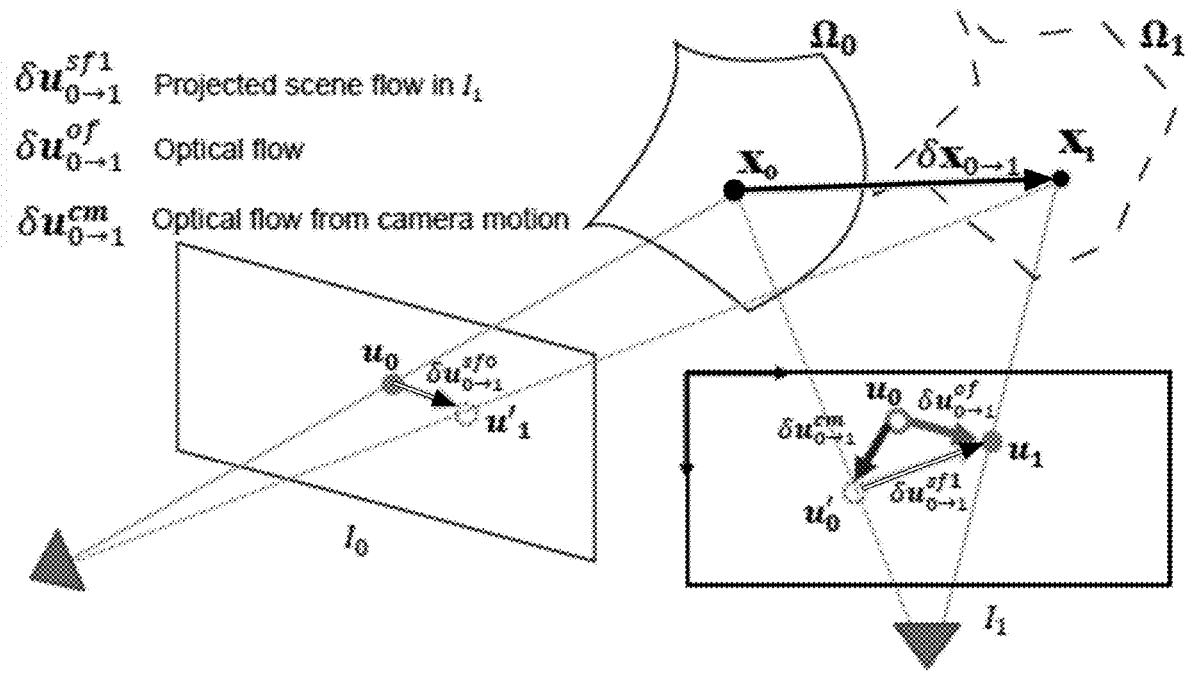

FIG. 1D illustrates 2D motion flow resulting from scene motion and camera motion, in accordance with an embodiment. Similarly, $u_o$ in $I_1$ is a visualization of the pixel location $x_0$ had in $I_0$. Note that $u'_0$ is a projected location of $x_0$ in $I_1$, as if $x_0$ were observed by $I_1$, and can be computed by camera motion as $\delta u_{0 \to 1}^{cm}$ and optical flow $\delta u_{0 \to 1}^{of}$. If the camera was static ($\delta u_{0 \to 1}^{cm}=0$) and observed both $x_0$ and $x_1$ at the position corresponding with image $I_1$, optical flow $\delta u_{0 \to 1}^{of}$ would be same as a projected scene flow $\delta u_{0 \to 1}^{sf1}$. The image $I_1$ shows each flow of the dynamic scene under camera panning. It is often difficult to determine if movement of an object between images in a sequence is caused by object motion, camera movement, or a combination of scene movement and camera movement.

In general, when $x_t$ is observed by a camera with known camera intrinsic parameters, $\pi(x_t)$ is defined to be the projection of $x_t$ to image coordinates $u_t$, and $\pi^{-1}(u_t, z_t)$ the inverse projection into 3D camera coordinates given the known depth $z_t$. Scene flow, $\delta x_{t \to t+1}$ is defined as the 3D motion vector of x from time t to time t+1. Optical flow offers direct 2D associations of measurements in $I_t$ and $I_{t+1}$. Suppose $C_t$ is a known camera extrinsic matrix (viewpoint pose) from $I_t$. Then the optical flow $\delta u_{t \to t+1}$ from $I_t$ to $I_{t+1}$ can be defined as follows:

$$\delta u_{t \to t+1}^{of} = \pi(C_{t+1}(x_t + \delta x_{t \to t+1})) - \pi(C_t x_t) \quad (1)$$

Equation (1) states the two-view geometric relationship between 2D optical flow and 3D scene flow. Equation (1) can be simplified by considering the camera's relative motion from $I_0$ to $I_1$, i.e., assuming t=0 and setting $C_0$ to identity:

$$\delta u_{0 \to 1}^{of} = \pi(C_1(x_0 + \delta x_{0 \to 1})) - \pi(x_0) \quad (2)$$

Given the optical flow $\delta u_{0 \to 1}^{of}$ and the depth from the RGBD data, the 3D scene flow vector can be computed as:

$$\delta x_{0 \to 1} = C_1^{-1} \pi^{-1}(u_0 + \delta u_{0 \to 1}^{of}, z_1) - \pi^{-1}(u_0, z_0) \quad (3)$$

Note that the relative viewpoint pose $C_1$ can be computed from 2D image correspondences. However, when the 3D scenes contain dynamic components (i.e., moving objects) as well as a rigid and stationary background structure, computing the relative viewpoint pose is difficult. Identifying inliers and outliers using rigidity is a key element for successful relative viewpoint pose estimation in a dynamic scene.

Figure 1E:
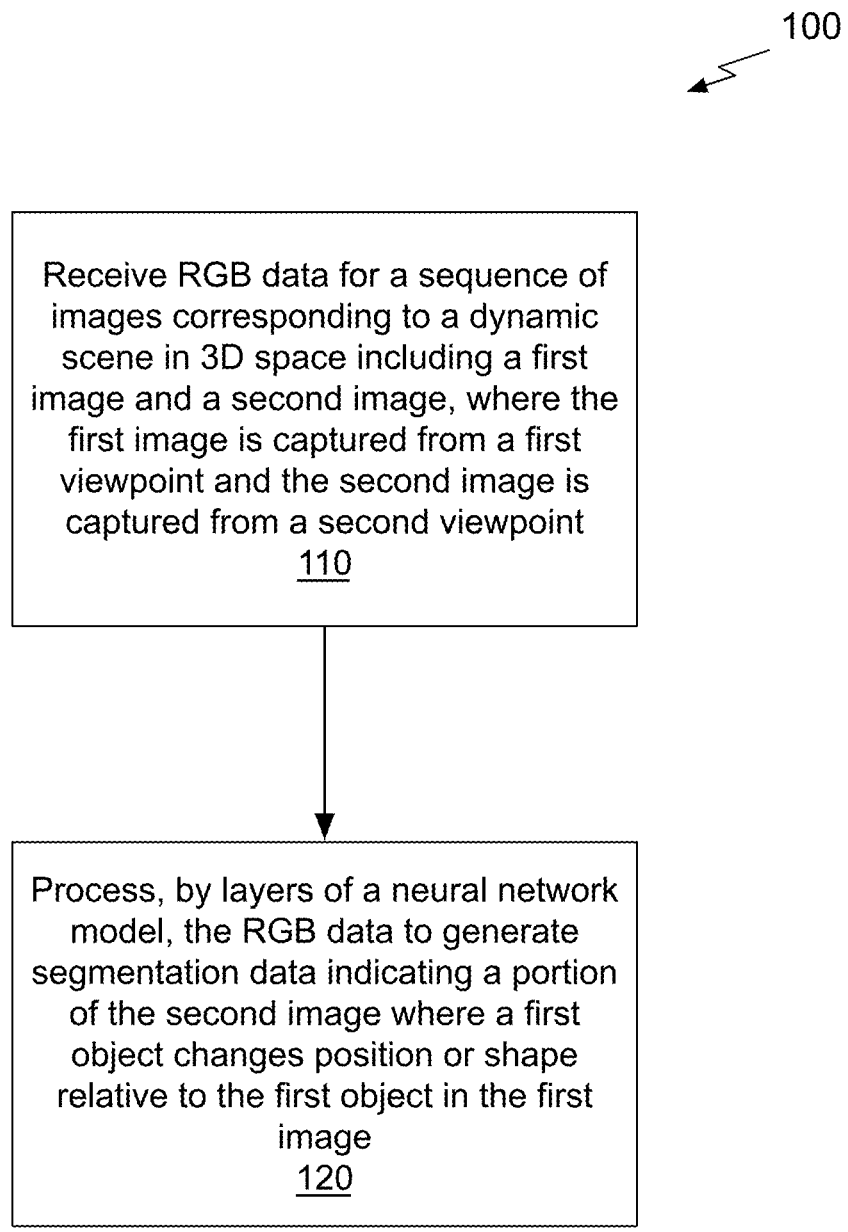
FIG. 1E illustrates a flowchart of a method for generating a rigidity mask for 3D motion field estimation, in accordance with an embodiment.

FIG. 1E illustrates a flowchart of a method 100 for generating a rigidity mask for 3D motion field estimation, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of implementing a neural network model. Furthermore, persons of ordinary skill in the art will understand that any system that performs method 100 is within the scope and spirit of embodiments of the present invention.

At step 110, color data for a sequence of images corresponding to a dynamic scene in 3D space including a first image and a second image is received by a neural network model. The first image is captured from a first viewpoint and the second image is captured from a second viewpoint. In the context of the following description, a viewpoint is an orientation or pose comprising a position and direction of a camera in 3D space. In an embodiment, the color data may be represented as red, green, and blue (RGB) color components, YUV components, or the like. In an embodiment, the color data for the sequence of images is processed to extract depth data. In an embodiment, the depth data corresponding to the color data is received with the color data.

At step 120, the color data is processed by layers of the neural network model to generate segmentation data indicating a portion of the second image where a first object changes position or shape relative the first object in the first image. In an embodiment, the change in position or shape of the first object in the images results from a combination of simultaneous viewpoint motion and 3D scene motion. In an embodiment, color and depth data (RGBD) are processed by layers of the neural network model to generate the segmentation data.

In an embodiment, the segmentation data comprises information identifying dynamic and static portions of each image (e.g., rigidity mask). In the context of the following description, the dynamic portions of each image are the foreground and the static portions of each image are the background. In an embodiment, the segmentation data also comprises viewpoint pose motion (e.g., camera position including rotation R and translation t). The dynamic portions of each image contain motion in the 3D space that is independent of the viewpoint pose motion. In other words, the motion in the 3D space (estimated 3D scene flow data) is segmented from the motion of the camera [R|t]. In an embodiment, the color and depth data are processed to produce a pose of the second viewpoint, where the pose includes a position and orientation of the second viewpoint (e.g., camera) in the 3D space. In an embodiment, the viewpoint pose motion is refined based on 2D optical flow data corresponding to the sequence of images.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
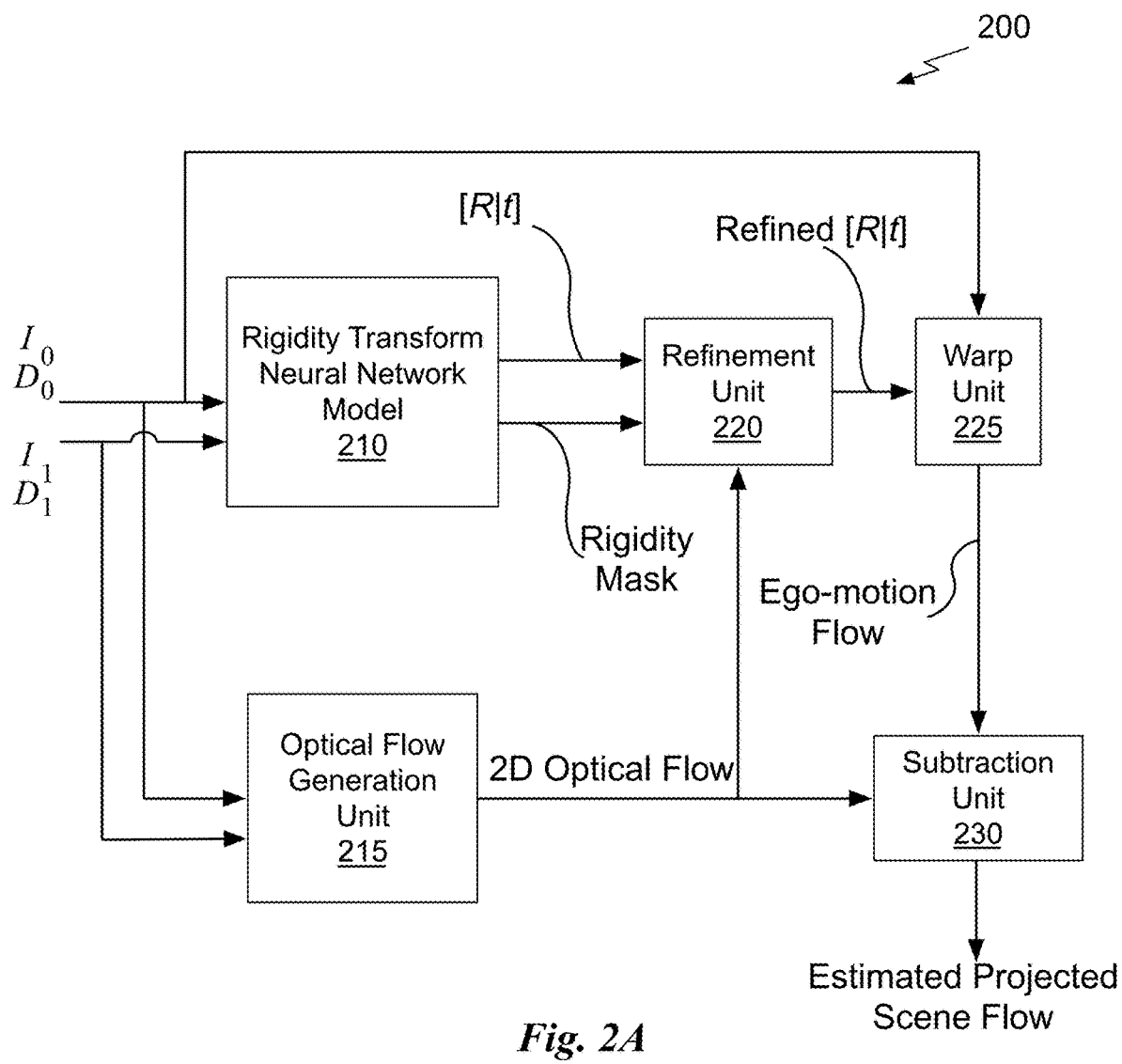
FIG. 2A illustrates a block diagram of a 3D motion field estimation system, in accordance with an embodiment.

FIG. 2A illustrates a block diagram of a 3D motion field estimation system 200, in accordance with an embodiment. The 3D motion field estimation system includes rigidity transform neural network model 210, an optical flow generation unit 215, a refinement unit 220, a warp unit 225, and a subtraction unit 230. Although the 3D motion field estimation system 200 is described in the context of processing units, one or more of the rigidity transform neural network model 210, the optical flow generation unit 215, the refinement unit 220, the warp unit 225, and the subtraction unit 230 may be performed by a program, custom circuitry, or by a combination of custom circuitry and a program. For example, the rigidity transform neural network model 210 may be implemented by a GPU (graphics processing unit), CPU (central processing unit), or any processor capable of implementing layers of a neural network. Furthermore, persons of ordinary skill in the art will understand that any system that performs the operations of the 3D motion field estimation system 200 is within the scope and spirit of embodiments of the present invention.

A sequential image pair with color data (I) and depth data (D) is input to the 3D motion field estimation system 200. In an embodiment, the depth data is not provided as an input to the 3D motion field estimation system 200 and the depth data is instead computed by the 3D motion field estimation system 200. In general, the rigidity transform neural network model 210 and the optical flow generation unit 215 each receive input data at time t and at time t+1, such as two frames of a sequence of images. The input image sequence may include dynamic scenes with a moving camera (e.g., panning), where camera motion and objects motions are "entangled" in each frame and the 3D motion field estimation system 200 computes the 3D motion field for each image pair.

To solve for 2D correspondences between image pairs, the optical flow generation unit 215 computes the 2D optical flow using any suitable algorithm. In an embodiment, the optical flow generation unit 215 is omitted, and the 2D optical flow is received as an input by the 3D motion field estimation system 200. The optical flow generation unit 215 may run concurrently with the rigidity-transform neural network model 210, providing 2D optical flow data to the refinement unit 220 and the subtraction unit 230.

The rigidity transform neural network model 210 processes the image pair data to generate segmentation data. In an embodiment, the depth data is not included as part of the image pair data input to the 3D motion field estimation system 200 and the depth data is computed by a depth solver (not shown) based only on the color data. The segmentation data includes a rigidity mask indicating rigid/non-rigid regions for one image of the image pair. The segmentation data may also include an estimated relative viewpoint pose (i.e., transform defined by rotation R and translation t). The rigidity transform neural network model 210 is trained to predict estimated 3D motion flows using training datasets including sequences of image data frames and corresponding ground-truth rigidity masks and relative viewpoint poses. The training dataset may include a first image sequence for viewpoint motion and a static scene, a second image sequence for scene motion and a static viewpoint, and a third image sequence for simultaneous viewpoint motion and scene motion. In an embodiment a portion of the training dataset includes a real background scene and synthetic foreground objects.

Importantly, when deployed, the 3D motion field estimation system 200 may perform 3D motion field estimation in real-time, for example, keeping pace with image rendering or image capture. The parameters (e.g., weights and biases) of the rigidity transform neural network model 210 are determined during training by applying the sequences of image data frames and minimizing errors between the ground-truth rigidity mask and relative viewpoint poses and the estimated rigidity mask and relative viewpoint poses, respectively, generated by the rigidity transform neural network model 210.

The relative viewpoint pose is further refined by the refinement unit 220 to improve accuracy of the viewpoint transformation based on the 2D optical flow and the rigidity mask, producing a refined relative viewpoint pose. In an embodiment, the 2D optical flow constrains refinement of the relative viewpoint pose. The relative viewpoint pose generated by the rigidity transform neural network model 210 may not always precisely generalize to new scenes. The refinement unit 220 may be configured to modify the viewpoint pose based on the estimated rigidity B and bidirectional dense optical flow $\delta u_{0 \to 1}^{of}$ and $\delta u_{1 \to 0}^{of}$. Estimation of $C_1$ may be viewed as a robust least square problem:

$$\underset{C_1}{\arg\min} \sum_{\{x_0, x_1\} \in \Omega(B)} [I]\rho(C_1 x_0 - x_1) \qquad (4)$$

where $x_i = \pi^{-1}(u_i, z_i)$ in all background regions B, predicted by the rigidity transform neural network model 210. [I] is an Iverson bracket for all the inlier correspondences. In an embodiment, the following technique is used to refine the viewpoint pose by filtering the inlier correspondences in several steps. First, forward backward consistency checking is used for bidirectional optical flow with a threshold of 0.75 to remove all flow correspondences which are not consistent, generating an occlusion map O. To prevent outliers at the boundary of rigidity B and occlusion O, a morphological operator with patch size 10 is used to dilate B and O. From all correspondences, bidirectional flow correspondences are uniformly sampled with a stride of 4 and the 1e4 points among the samples that are closest to the camera viewport are selected. The sampling helps to solve the optimization more efficiently and in a more numerically stable manner. The Huber norm $\rho(\cdot)$ may be used as a robust way to handle the remaining outliers. Equation (4) may be solved efficiently via Gauss-Newton with $C_1$ initialized as the viewpoint pose output by the rigidity transform neural network model 210. With accurate filtered correspondences, the initialization step trivially helps but can also be replaced by an identity initialization.

The warp unit 225 receives the refined relative viewpoint pose and the image data for the earlier image ($I_0D_0$) of the image pair and generates 2D viewpoint motion flow data (ego-motion flow) for the later image ($I_1D_1$) of the image pair. In the context of the following description, observed optical flow that is purely induced by the camera motion is referred to as ego-motion flow. For example, referring to FIGS. 1B, 1C, and 1D, when an observed x in a scene remains static between the two frames, $\delta x_{0 \to 1} = 0$ and therefore $x_1 = x_0$, the observed optical flow is the ego-motion flow:

$$\delta u_{0 \to 1}^{cm} = \pi(C_1 x_0) - \pi(x_0) \qquad (5)$$

The projected scene flow is a projection of a 3D scene flow $\delta x_{0 \to 1}$ in $I_1$ if $x_0$ was observed from $I_1$, which can be computed from the ego-motion and the 2D optical flow. The subtraction unit 230 subtracts the ego-motion flow from the 2D optical flow to generate the estimated projected scene flow for the later image:

$$\delta u_{0 \to 1}^{sf} = \delta u_{0 \to 1}^{of} - \delta u_{0 \to 1}^{cm} \qquad (6)$$

The estimated projected scene flow may also be referred to as non-rigid residual. All locations with zero values in the estimated projected scene flow indicate the rigidity region in the ground-truth data. The estimated projected scene flow is the relationship between correspondences between the input image pairs and the 2D scene flow in physical 3D scenes with object motions and viewpoint motion. The estimated projected scene flow is derived from relative viewpoint poses between two temporal views.

Figure 2B:
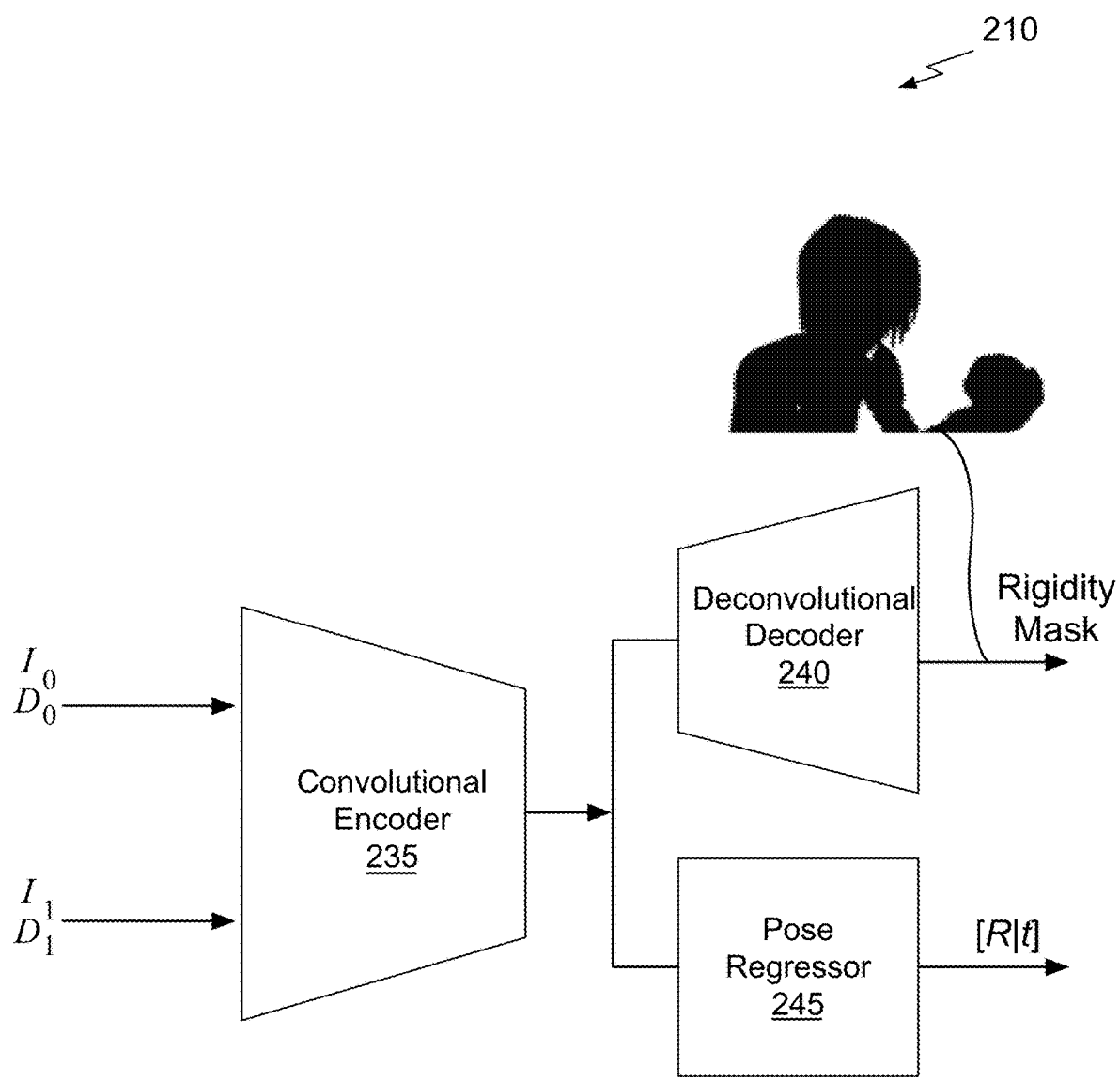
FIG. 2B illustrates a block diagram of the rigidity transform neural network model from FIG. 2A, in accordance with an embodiment.

FIG. 2B illustrates a block diagram of the rigidity transform neural network model 210 from FIG. 2A, in accordance with an embodiment. The rigidity transform neural network model 210 is a fully convolutional encoder-decoder architecture including a convolutional encoder 235, a deconvolutional decoder 240, and a pose regressor 245. In an embodiment, the convolutional encoder 235 and the pose regressor 245 predicts the viewpoint pose as a relative translation t and rotation Θ. The convolutional encoder 235 and the deconvolutional decoder 240 predict the scene rigidity as a binary mask. An example rigidity mask is shown in FIG. 2B, where the black pixels indicate regions having motion (non-rigid) and white pixels indicate static regions (rigid).

In an embodiment, the inputs to the convolutional encoder 235 are 12 channel tensors encoded with [(u−$c_x$)/$f_x$, (v−$c_y$)/$f_y$, 1/d, r, g, b] computed from a pair of RGB-D images (6 tensors per image) and the viewpoint (camera) intrinsic parameters [$f_x$, $f_y$, $c_x$, $c_y$] and the depth d. Considering the different range of depth values, the 6 tensor representation for each input image is numerically stable in training and delivers good generalization performance. In an embodiment, 1/d is truncated to the range [1e-4,10], which is able to cover scenes of various scales. The two 6 channel tensors may be concatenated to form a 12-channel tensor for input to the convolutional encoder 235. Details of the convolutional encoder 235, the deconvolutional decoder 240, and the pose regressor 245 are described in conjunction with FIG. 2C.

Figure 2C:
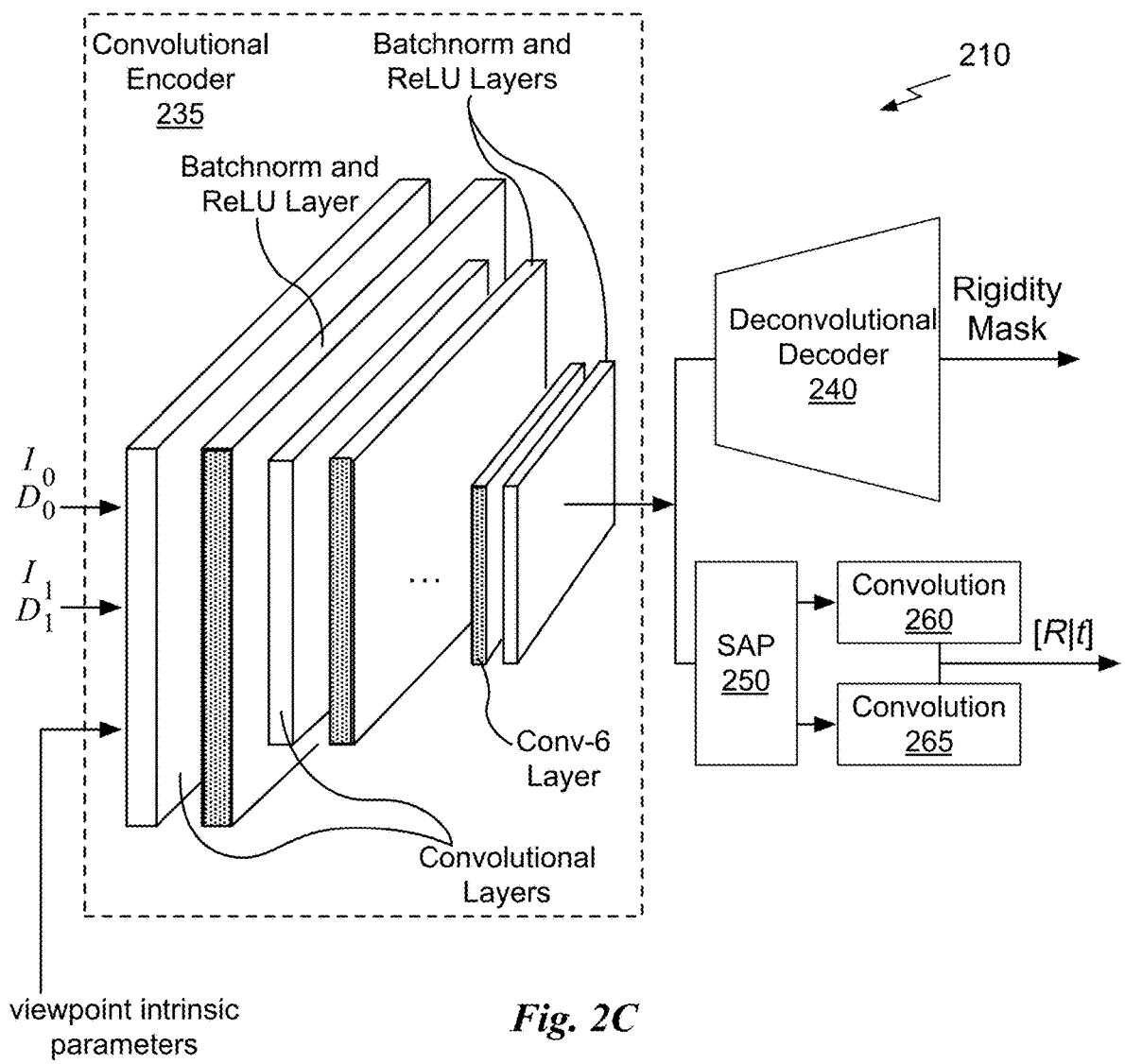
FIG. 2C illustrates another block diagram of the rigidity transform neural network model from FIG. 2A, in accordance with an embodiment.

FIG. 2C illustrates another block diagram of the rigidity transform neural network model 210 from FIG. 2A, in accordance with an embodiment. The convolutional encoder 235 comprises five stride-2 convolutional layers (1-5) which gradually reduce spatial resolution and one stride-1 convolution as the conv-6 layer. Each convolution is followed by a batch normalization and rectified linear unit (ReLU) layer. The target is to predict the camera relative translation t and rotation Θ. After the conv-6 layer, a spatial-average pooling (SAP) layer 250 is used to reduce the features into a vector. In an embodiment, the vector is a 1024D vector. With two 1×1 convolution layers that output 3 channels, t and Θ are separately estimated by convolutional layers 260 and 265. In an embodiment, the relative viewpoint transformation between two frames is assumed to be small, and thus the rotation is represented as R(α, β, γ)=$R_x$(α)$R_y$(β) $R_z$(γ) with Euler angles Θ=[α, β, γ]. In an embodiment, the regression loss is a weighted combination of the robust Huber loss ρ(·) for translation and rotation as:

$$\mathcal{L}_p = \rho(t-t^*) + \omega_\Theta \rho(\Theta - \Theta^*) \quad (7)$$

The deconvolutional decoder 240 comprises five deconvolution (transpose convolution) layers which gradually up-sample the conv-6 feature into input image scale and reshape it into the original image resolution. The rigidity attention is estimated by the deconvolutional decoder 240 as a binary segmentation problem with binary cross-entropy loss $\mathcal{L}_r$. The overall loss is a weighted sum of both loss functions: $\mathcal{L}_c = \omega_p \mathcal{L}_p + \mathcal{L}_r$.

To learn the rigid regions of two viewpoints, during training, the rigidity transform neural network model 210 is forced to capture both scene structures and epipolar constraints w.r.t. two viewpoints. First, the rigidity transform neural network model 210 is fully convolutional and the viewpoint pose is regressed at the input to the SAP layer 250 to preserve feature distributions spatially. Importantly, features for rigidity segmentation and pose regression can interact directly with each other spatially across each feature map. In an embodiment, no skip layer connections are implemented in the rigidity transform neural network model 210. Importantly, simultaneously learning of viewpoint pose and rigidity may help the rigidity transform neural network model 210 achieve better generalization in complex scenes. In an embodiment, during training two identical views are used as input with a fully rigid mask as output with 20% probability during data augmentation, which prevents the rigidity transform neural network model 210 from only using a single view for prediction.

To provide better supervision during training and encourage generalization, a tool and methodology has been developed that enables the creation of a scalable semi-synthetic RGB-D dynamic scene dataset. The scalable semi-synthetic RGB-D dynamic scene dataset combines real-world static rigid background with non-rigid synthetic human motions and provides ground-truth (i.e., target) color, depth, optical flow and viewpoint pose. In an embodiment, the rigidity transform neural network model 210 is trained using the scalable semi-synthetic RGB-D dynamic scene dataset.

Figure 2D:
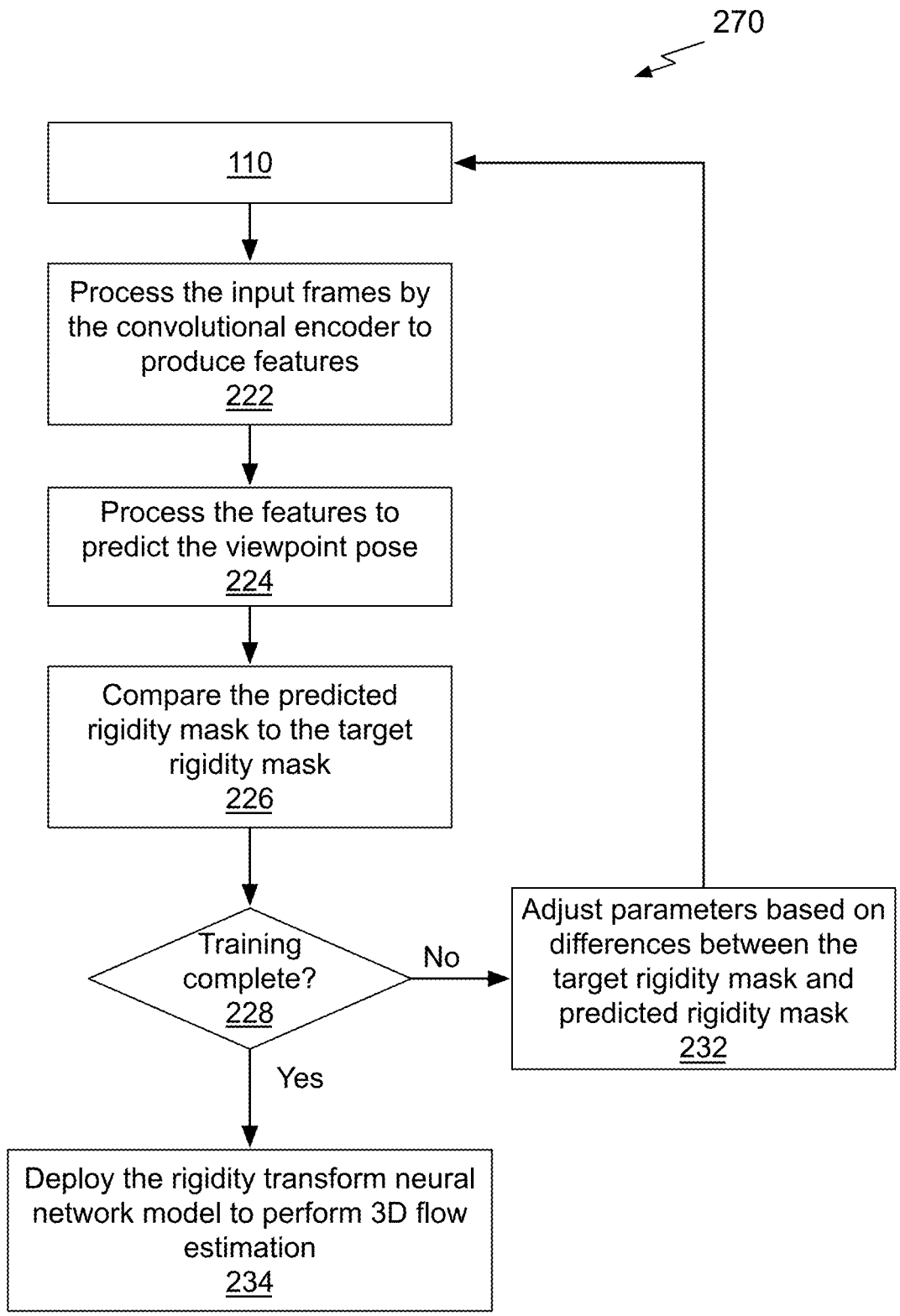
FIG. 2D illustrates a flowchart of a method for training the rigidity transform neural network model, in accordance with an embodiment.

FIG. 2D illustrates a flowchart of a method 270 for training the rigidity transform neural network model 210, in accordance with an embodiment. Although method 270 is described in the context of a processing unit, the method 270 may also be performed by a program, custom circuitry, or by a combination of custom circuitry and a program. For example, the method 270 may be executed by a GPU (graphics processing unit), CPU (central processing unit), or any processor capable of implementing a neural network model. Furthermore, persons of ordinary skill in the art will understand that any system that performs method 270 is within the scope and spirit of embodiments of the present invention.

Step 110 is completed as described in conjunction with FIG. 1E. At step 222, the color and depth data for a sequence of images and 2D correspondence data is processed by the rigidity transform neural network model 210 to produce features. At step 224, the features are processed by the rigidity transform neural network model 210 to predict the rigidity mask. In an embodiment the features may also be processed to generate the viewpoint transform. The rigid scene components obey the epipolar constraints induced by the viewpoint ego-motion and serve as the regions of attention of the viewpoint transform. At step 226, the predicted rigidity mask is compared with the ground-truth (target) rigidity mask. In an embodiment, the predicted viewpoint pose is compared with the ground-truth (target) relative viewpoint pose.

At step 228, based on differences between the predicted rigidity mask and the target rigidity mask, training may be complete. A loss function, such as the binary cross-entropy loss function, may be computed to measure distances (i.e., differences or gradients) between the target rigidity mask and the predicted rigidity mask. The rigidity transform neural network model 210 is deemed to be sufficiently trained when the predicted rigidity masks generated for the sequence of images from the training dataset match the target rigidity masks or a threshold accuracy is achieved for the training dataset.

When training is complete at step 228, at step 234, the rigidity transform neural network model 210 may be deployed to perform 3D flow estimation. Otherwise, when training is not complete at step 228, at step 232, parameters are adjusted to reduce differences between the target rigidity mask and the predicted rigidity mask and steps 110 through 228 are repeated. In an embodiment, at step 232, parameters may also be adjusted to reduce differences between the target viewpoint pose and the predicted viewpoint pose. Through the method 270, the rigidity transform neural network model 210 may be trained to simultaneously learn viewpoint motion and segmentation of the scene into dynamic and static regions. Segmentation is challenging due to the ambiguity induced by the combination of viewpoint motion and scene (object) motion.

Previous work on camera pose estimation focused on either purely static or quasistatic scenes, where scene motions are absent or the amount of motion minimal.

Existing solutions disambiguate the camera and scene motion using hand-coded criteria, such as prior information in motion or semantic knowledge. In contrast, the 3D motion field estimation system 200 can be trained to learn rigidity and viewpoint pose estimation for dynamic scenes with a dynamic viewpoint, including dynamic scenes with multiple moving objects.

The technique for 3D flow estimation implemented by the 3D motion field estimation system 200 includes generation of two components that are used to produce the 3D motion field representing the dynamic part of a scene. The two components are information identifying dynamic and static portions of each image (e.g., rigidity mask) and viewpoint pose (e.g., camera position including rotation R and translation t). The dynamic portions of each image contain motion in the 3D space that is independent of the viewpoint. In other words, the motion in the 3D space (estimated 3D scene flow data) is segmented from the motion of the camera [R|t]. The projected scene flow may then be computed based on the rigidity mask, viewpoint pose, and the 2D optical flow.

Parallel Processing Architecture

Figure 3:
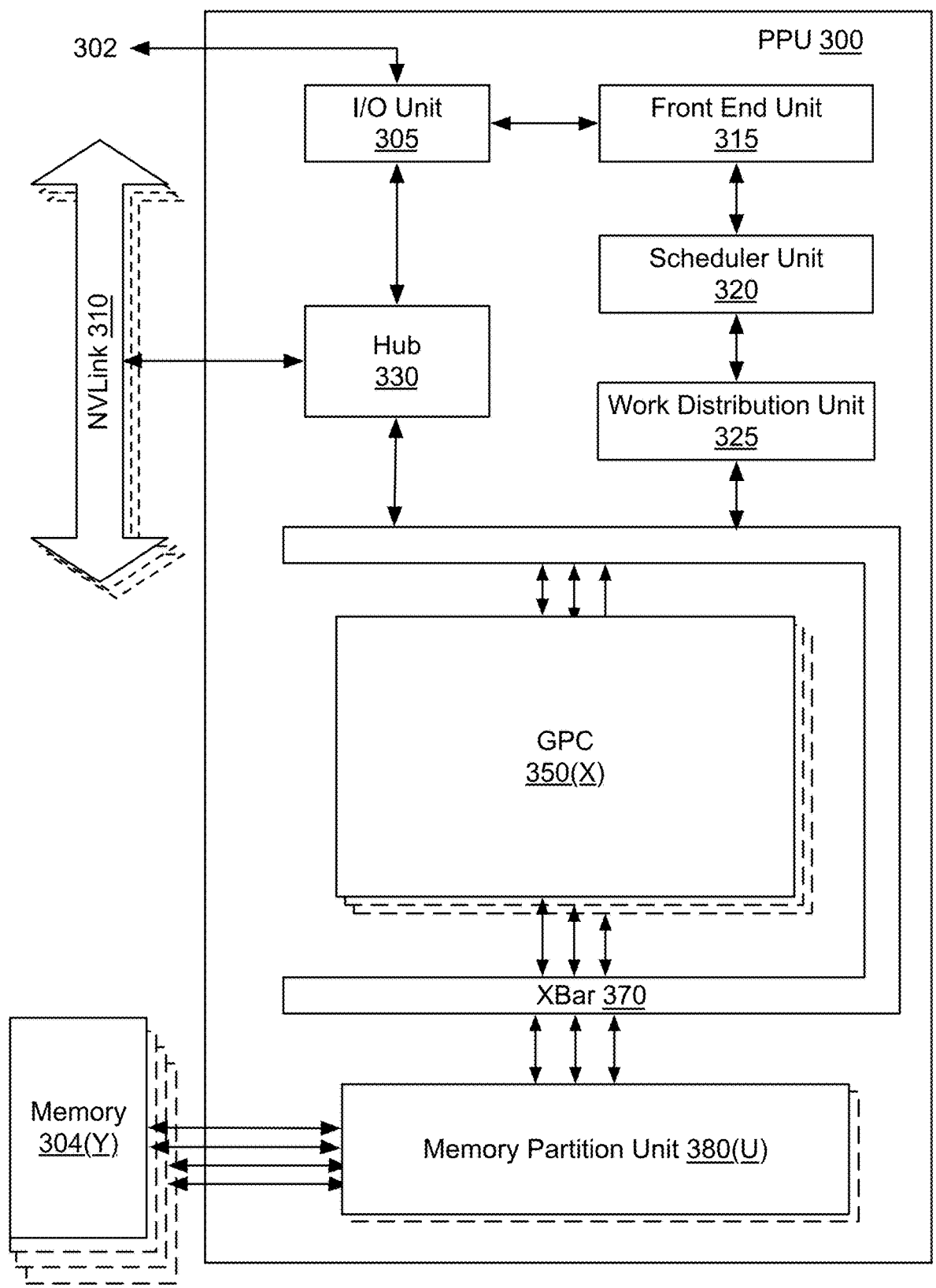
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
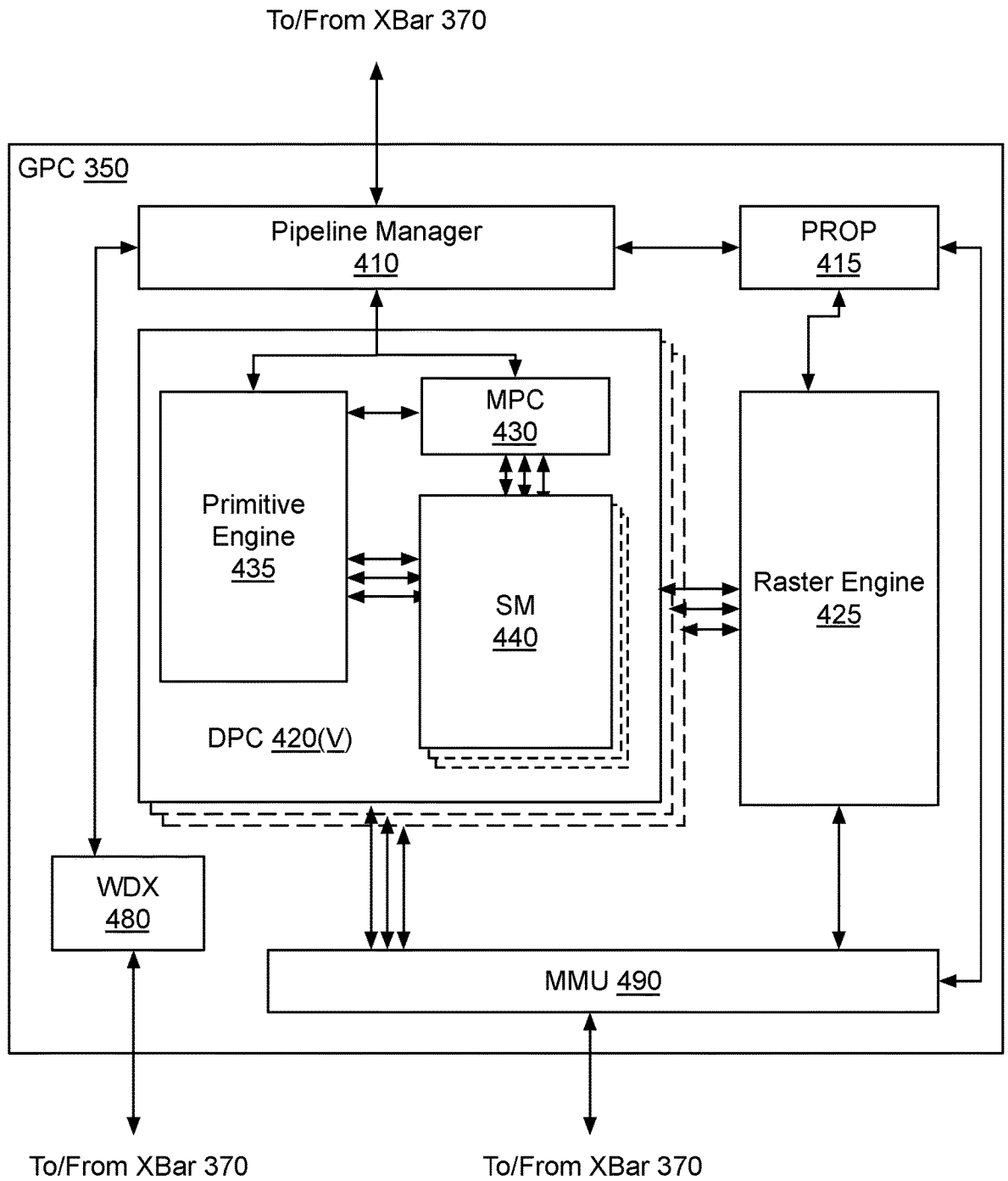
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
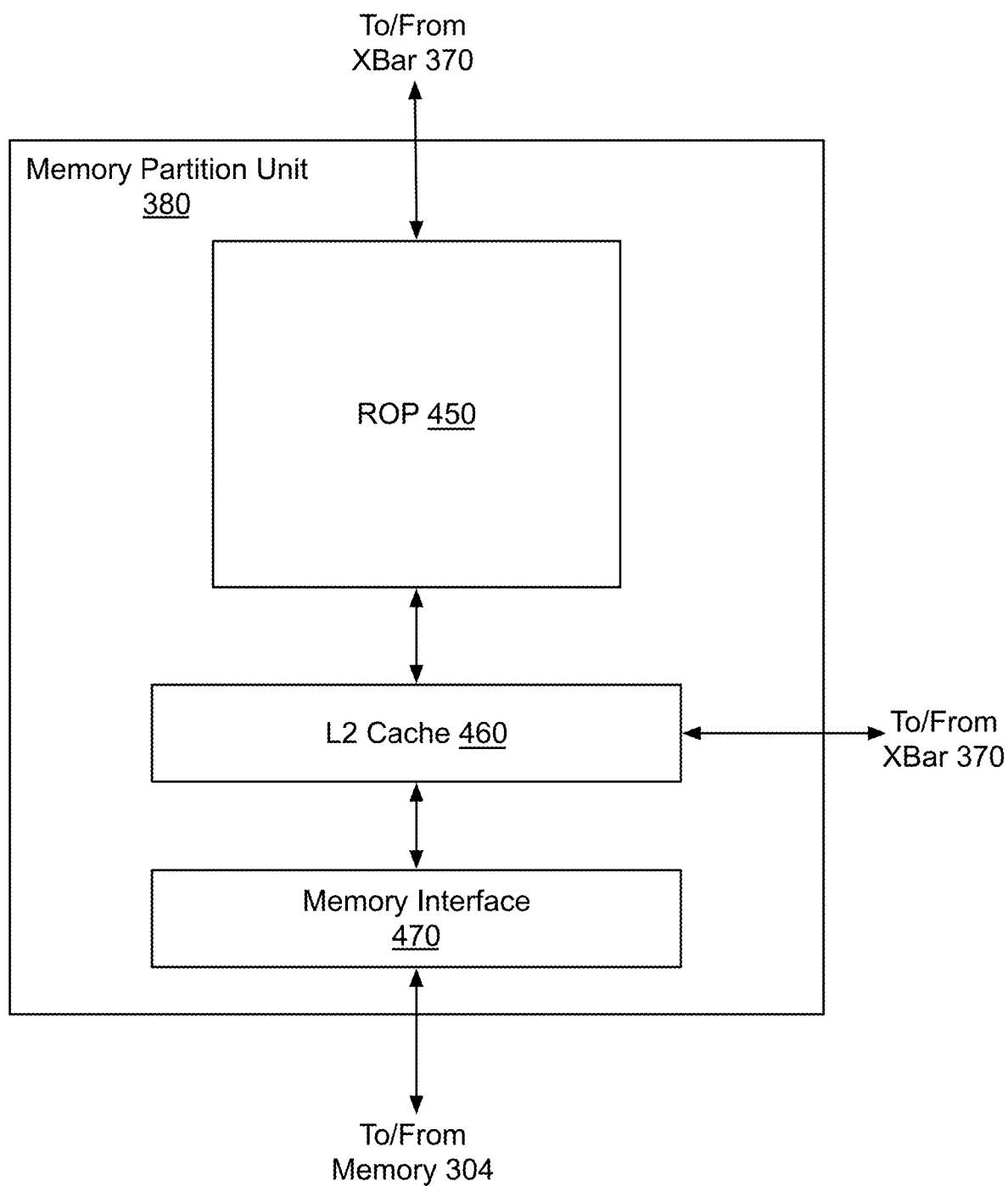
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads)

from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the sme instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
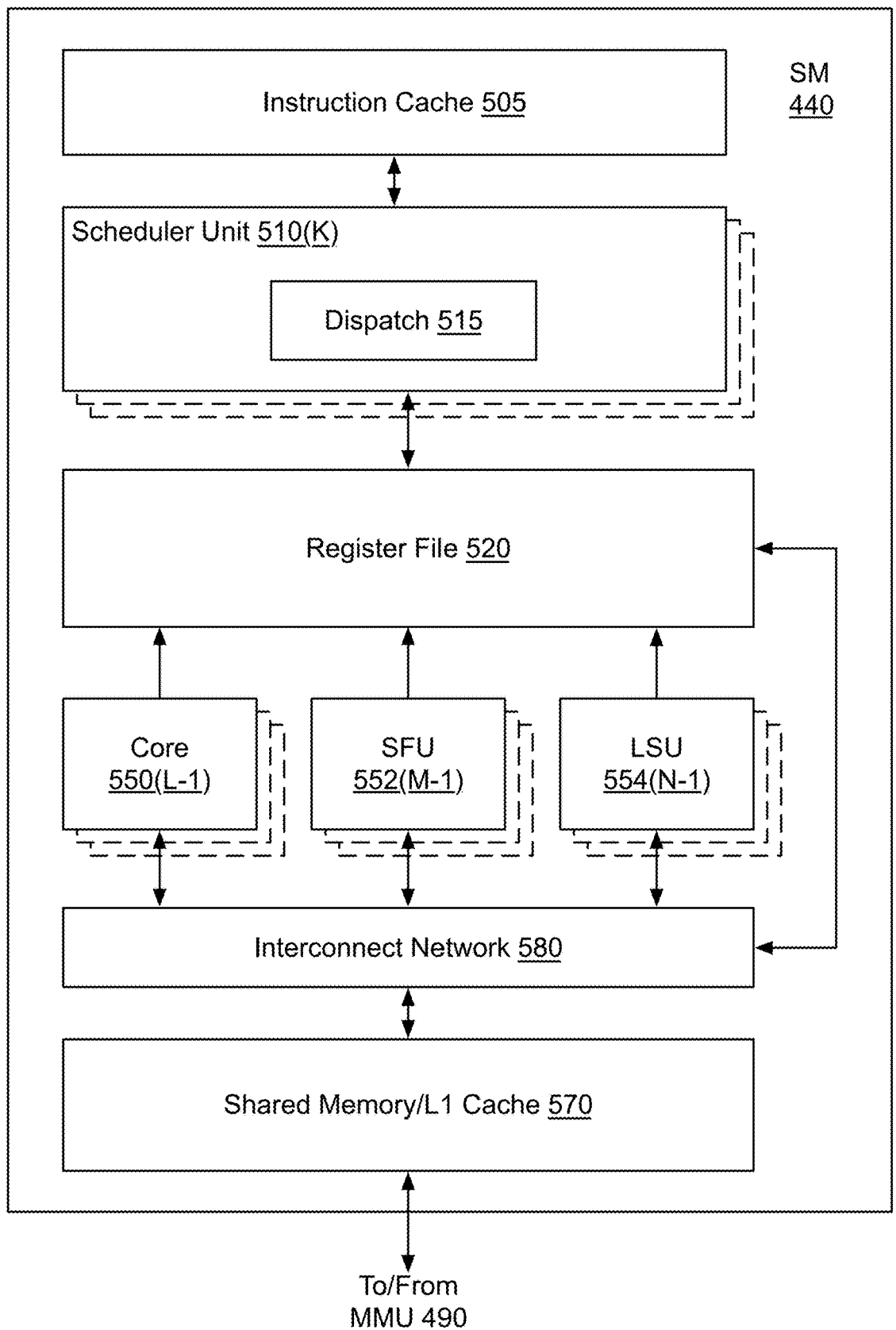
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
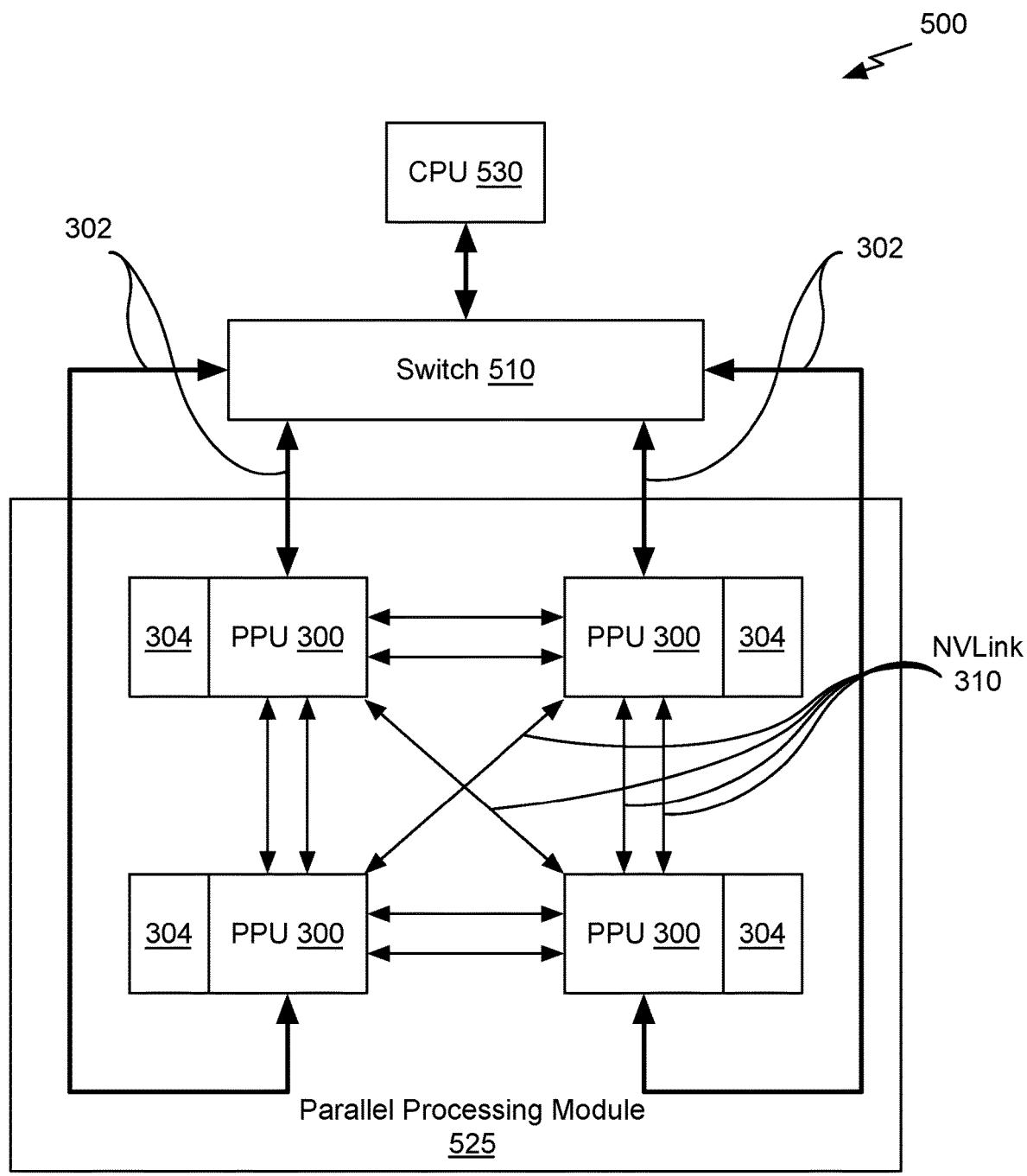
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the methods 100 and 270 shown in FIGS. 1E and 2D, respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
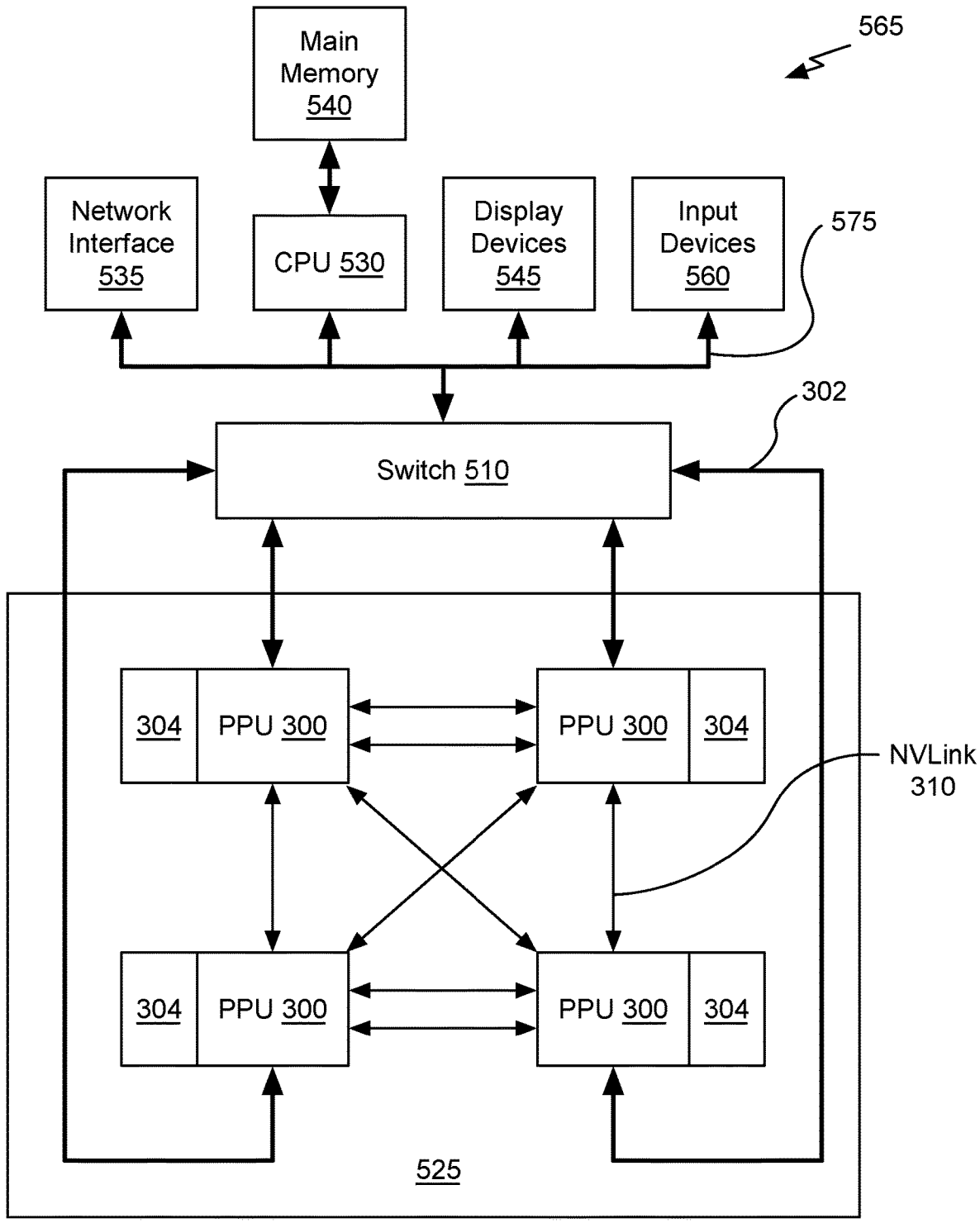
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 100 and 270 shown in FIGS. 1E and 2D, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
receiving color data for a sequence of images corresponding to a dynamic scene in three-dimensional (3D) space including a first image and a second image, wherein the first image is captured from a first viewpoint and the second image is captured from a second viewpoint;
processing the color data by layers of a neural network model to generate segmentation data indicating a portion of the second image where a first object changes position or shape relative to a position or shape of the first object in the first image;
processing the color data by the layers of the neural network model to produce a pose of the second viewpoint, the pose including a position and orientation in the 3D space;
warping the pose to generate 2D viewpoint motion flow data for the second image; and
subtracting the 2D viewpoint motion flow data from two-dimensional optical flow data for the sequence of images to produce estimated projected 3D scene flow data for the second image.

2. The computer-implemented method of claim 1, further comprising refining the pose based on the two-dimensional optical flow data.

3. The computer-implemented method of claim 1, further comprising refining the segmentation data based on the two-dimensional optical flow data.

4. The computer-implemented method of claim 1, further comprising:
receiving depth data for the sequence of images; and
processing the depth data with the color data to generate the segmentation data.

5. The computer-implemented method of claim 1, further comprising:
processing the sequence of images to extract depth data; and
processing the depth data with the color data to generate the segmentation data.

6. The computer-implemented method of claim 1, wherein the segmentation data is a mask comprising a single bit for each pixel in the second image.

7. The computer-implemented method of claim 1, wherein the layers of the neural network model comprise one or more convolutional layers followed by one or more deconvolutional layers.

8. The computer-implemented method of claim 1, wherein the estimated projected 3D scene flow data is used for one or more of robot manipulation, dynamic scene reconstruction, autonomous driving, action recognition, and video analysis.

9. A computer-implemented method, comprising:
training a neural network model using a dataset including a first image sequence for viewpoint motion and a static scene, a second image sequence for scene motion and a static viewpoint, and a third image sequence for simultaneous viewpoint motion and scene motion;
receiving color data for a sequence of images corresponding to a dynamic scene in three-dimensional (3D) space including a first image and a second image, wherein the first image is captured from a first viewpoint and the second image is captured from a second viewpoint; and
processing the color data by layers of the neural network model to generate segmentation data indicating a portion of the second image where a first object changes position or shape relative to a position or shape of the first object in the first image.

10. The computer-implemented method of claim 9, wherein a portion of the dataset includes a real background scene and synthetic foreground objects.

11. A system, comprising:
a processor configured to:
receive color data for a sequence of images corresponding to a dynamic scene in three-dimensional (3D) space including a first image and a second image, wherein the first image is captured from a first viewpoint and the second image is captured from a second viewpoint;
process the color data by layers of a neural network model to generate segmentation data indicating a portion of the second image where a first object changes position or shape relative to a position or shape of the first object in the first image;
process the color data by the layers of the neural network model to produce a pose of the second viewpoint, the pose including a position and orientation in the 3D space;
warp the pose to generate 2D viewpoint motion flow data for the second image; and
subtract the 2D viewpoint motion flow data from two-dimensional optical flow data for the sequence of images to produce estimated projected 3D scene flow data for the second image.

12. The system of claim 11, wherein the processor unit is further configured to refine the pose based on the two-dimensional optical flow data.

13. The system of claim 11, wherein the processor is further configured to refine the segmentation data based on the two-dimensional optical flow data.

14. The system of claim 11, wherein the processor is further configured to:
receive depth data for the sequence of images; and
process the depth data with the color data to generate the segmentation data.

15. The system of claim 11, wherein the segmentation data is a mask comprising a single bit for each pixel in the second image.

16. A system comprising: a processor configured to:
train a neural network model using a dataset including a first image sequence for viewpoint motion and a static scene, a second image sequence for scene motion and a static viewpoint, and a third image sequence for simultaneous viewpoint motion and scene motion;
receive color data for a sequence of images corresponding to a dynamic scene in three-dimensional (3D) space including a first image and a second image, wherein the first image is captured from a first viewpoint and the second image is captured from a second viewpoint; and process the color data by layers of the neural network model to generate segmentation data indicating a portion of the second image where a first object changes position or shape relative to a position or shape of the first object in the first image.

17. A non-transitory, computer-readable storage medium storing instructions that, when executed by a processor, cause the processor unit to:
   receive color data for a sequence of images corresponding to a dynamic scene in three-dimensional (3D) space including a first image and a second image, wherein the first image is captured from a first viewpoint and the second image is captured from a second viewpoint;
   process the color data by layers of a neural network model to generate segmentation data indicating a portion of the second image where a first object changes position or shape relative to a position or shape of the first object in the first image;
   process the color data by the layers of the neural network model to produce a pose of the second viewpoint, the pose including a position and orientation in the 3D space;
   warp the pose to generate 2D viewpoint motion flow data for the second image; and
   subtract the 2D viewpoint motion flow data from two-dimensional optical flow data for the sequence of images to produce estimated projected 3D scene flow data for the second image.

18. The non-transitory, computer-readable storage medium of claim 17, further comprising refining the pose based on the two-dimensional optical flow data.

19. The non-transitory, computer-readable storage medium of claim 17, further comprising refining the segmentation data based on the two-dimensional optical flow data.

20. A non-transitory, computer-readable storage medium storing instructions that, when executed by a processor, cause the processor to:
   train a neural network model using a dataset including a first image sequence for viewpoint motion and a static scene, a second image sequence for scene motion and a static viewpoint, and a third image sequence for simultaneous viewpoint motion and scene motion, wherein the neural network model:
   receives color data for a sequence of images corresponding to a dynamic scene in three-dimensional (3D) space including a first image and a second image, wherein the first image is captured from a first viewpoint and the second image is captured from a second viewpoint; and
   processes the color data to generate segmentation data indicating a portion of the second image where a first object changes position or shape relative to a position or shape of the first object in the first image.

* * * * *